Dec. 30, 1930.   W. H. GIBB   1,787,039
SEAM WELDING MACHINE
Filed June 28, 1928   5 Sheets-Sheet 1
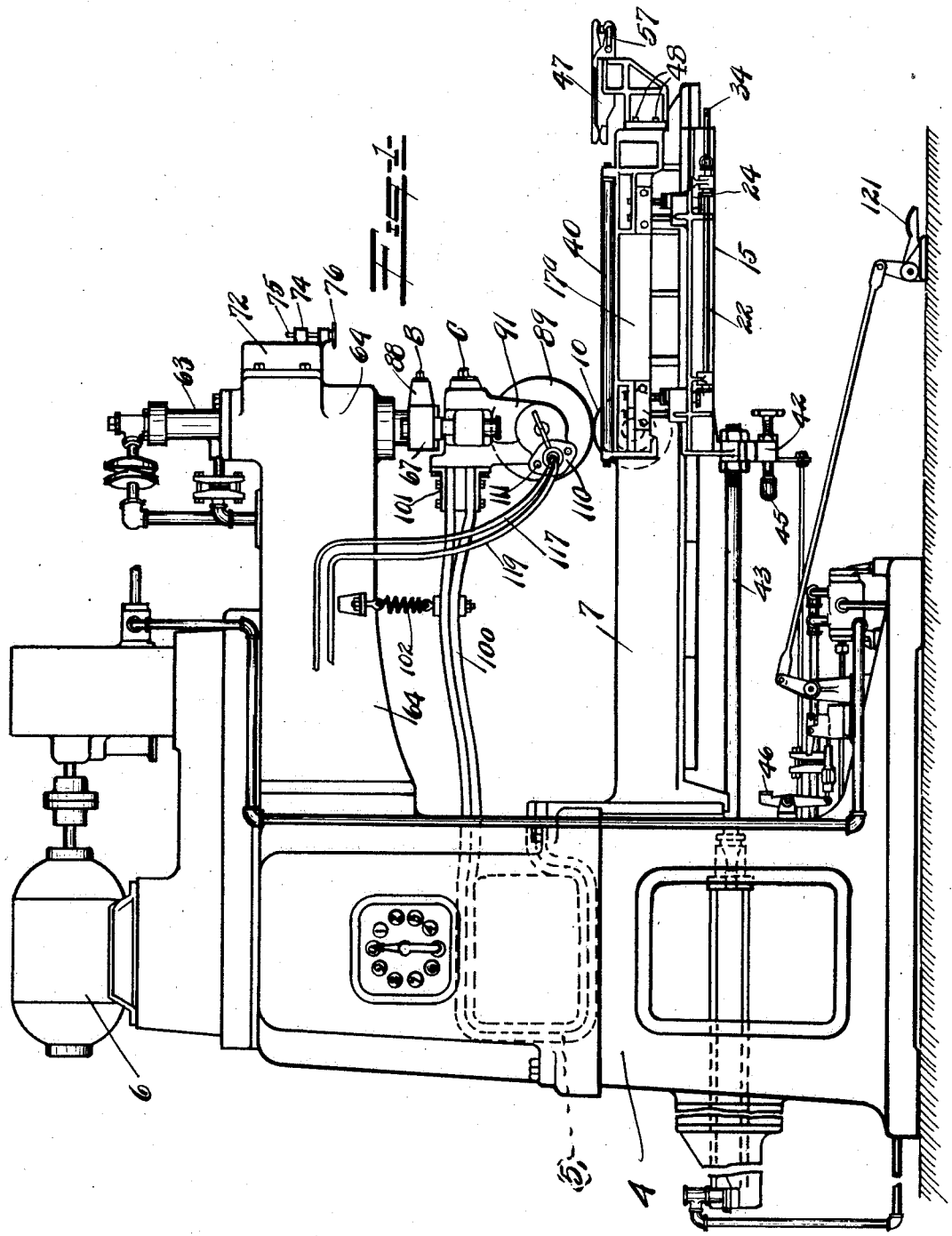
INVENTOR.
William H. Gibb.
BY Frank C. Farman.
ATTORNEYS.

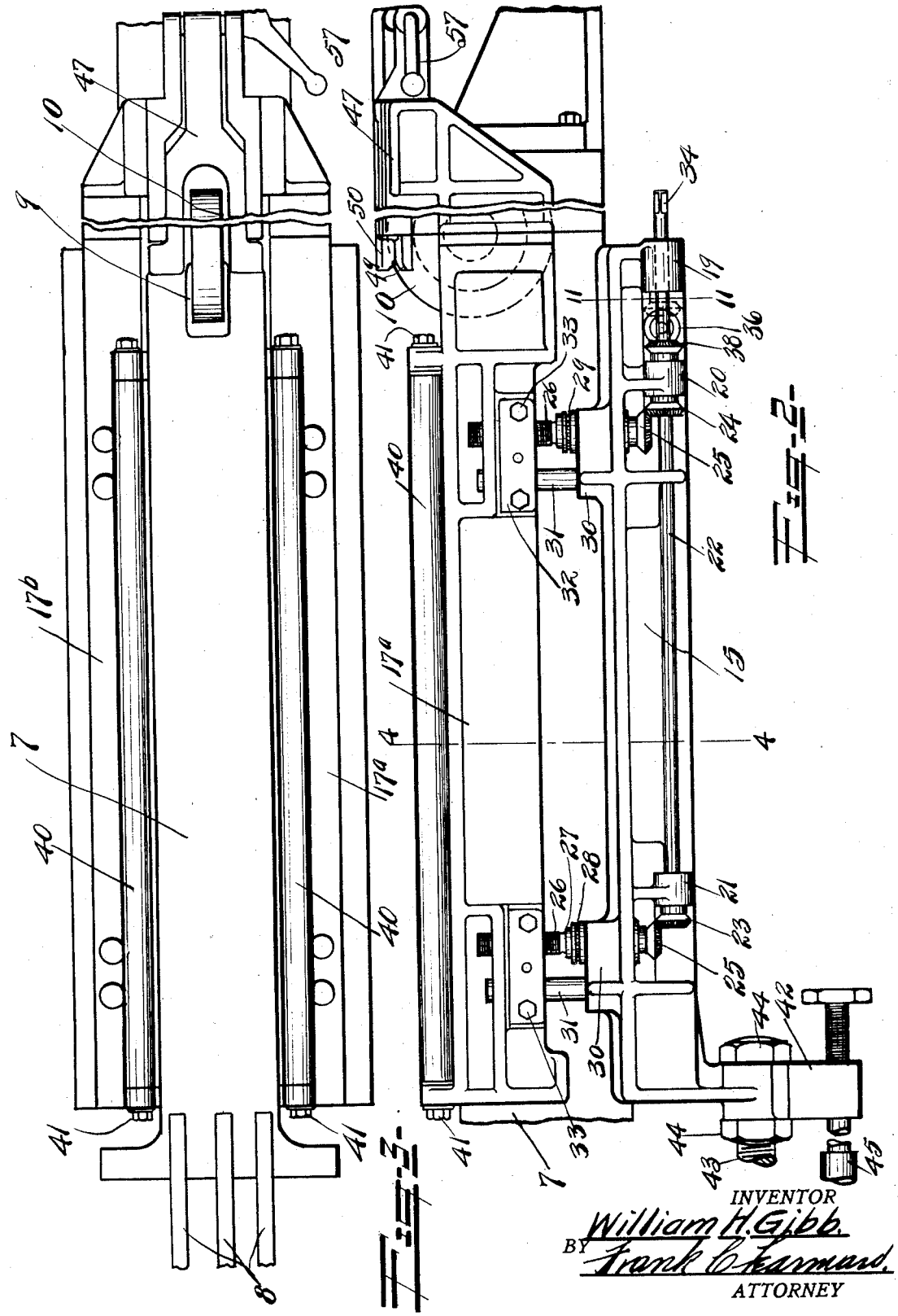

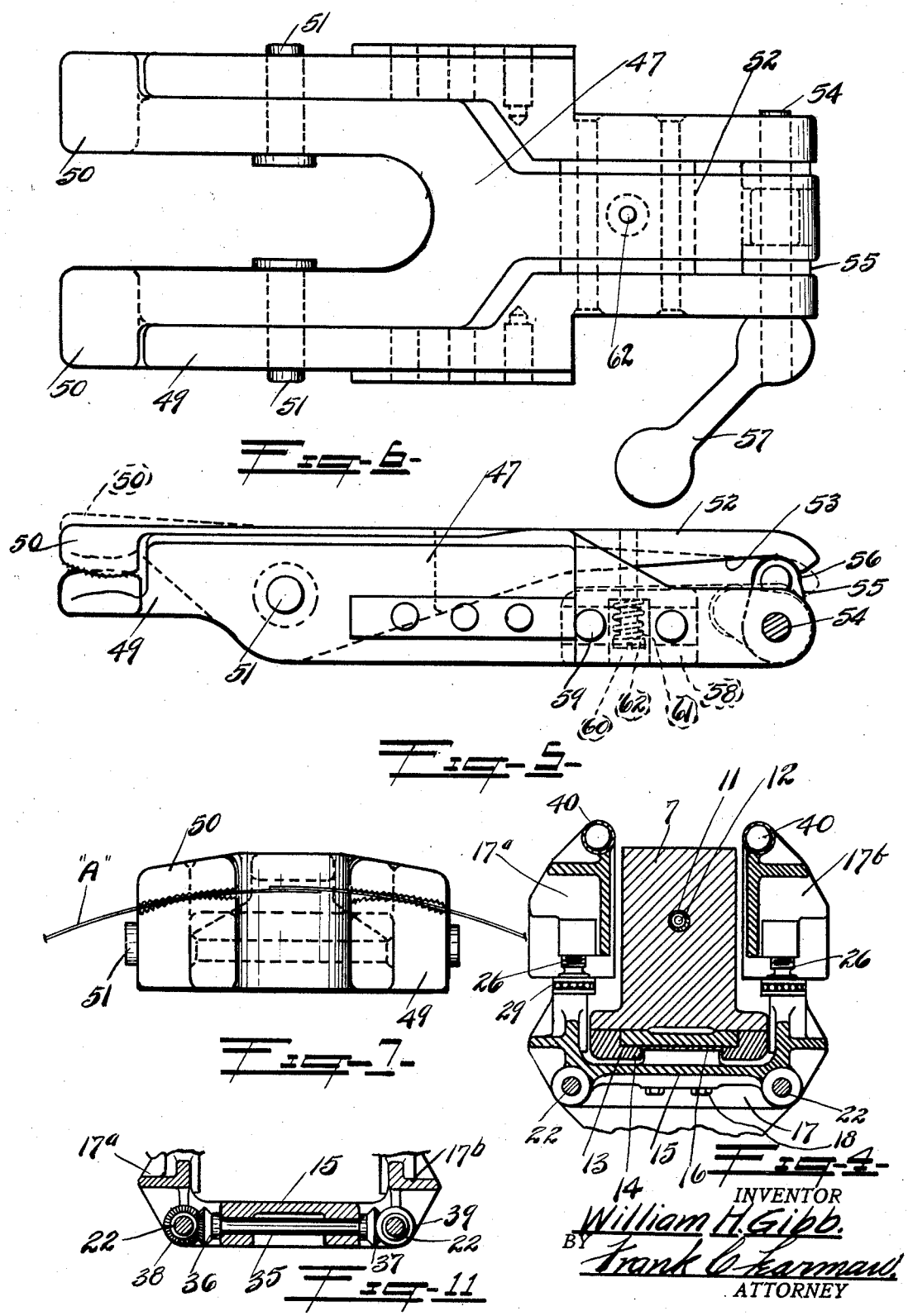

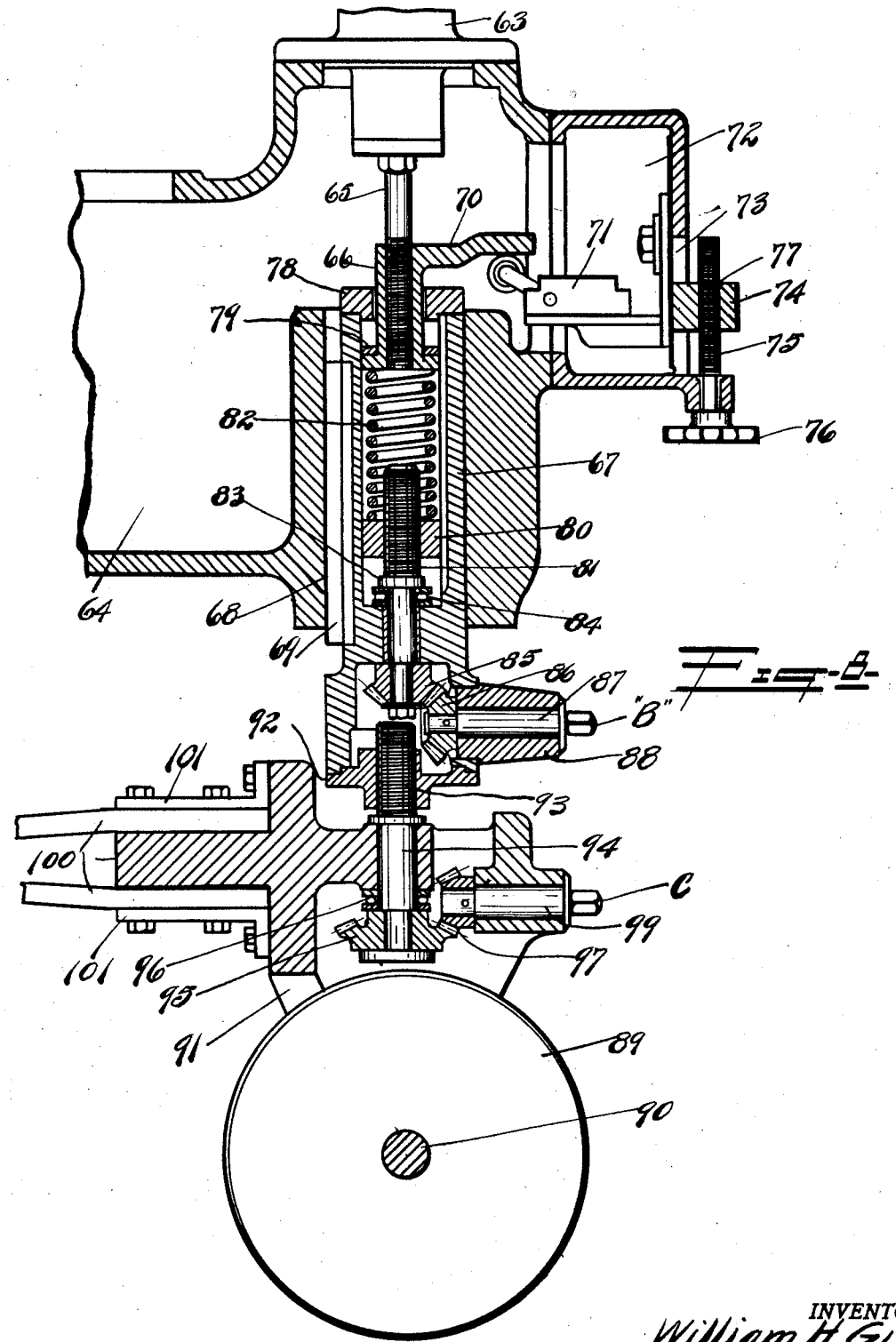

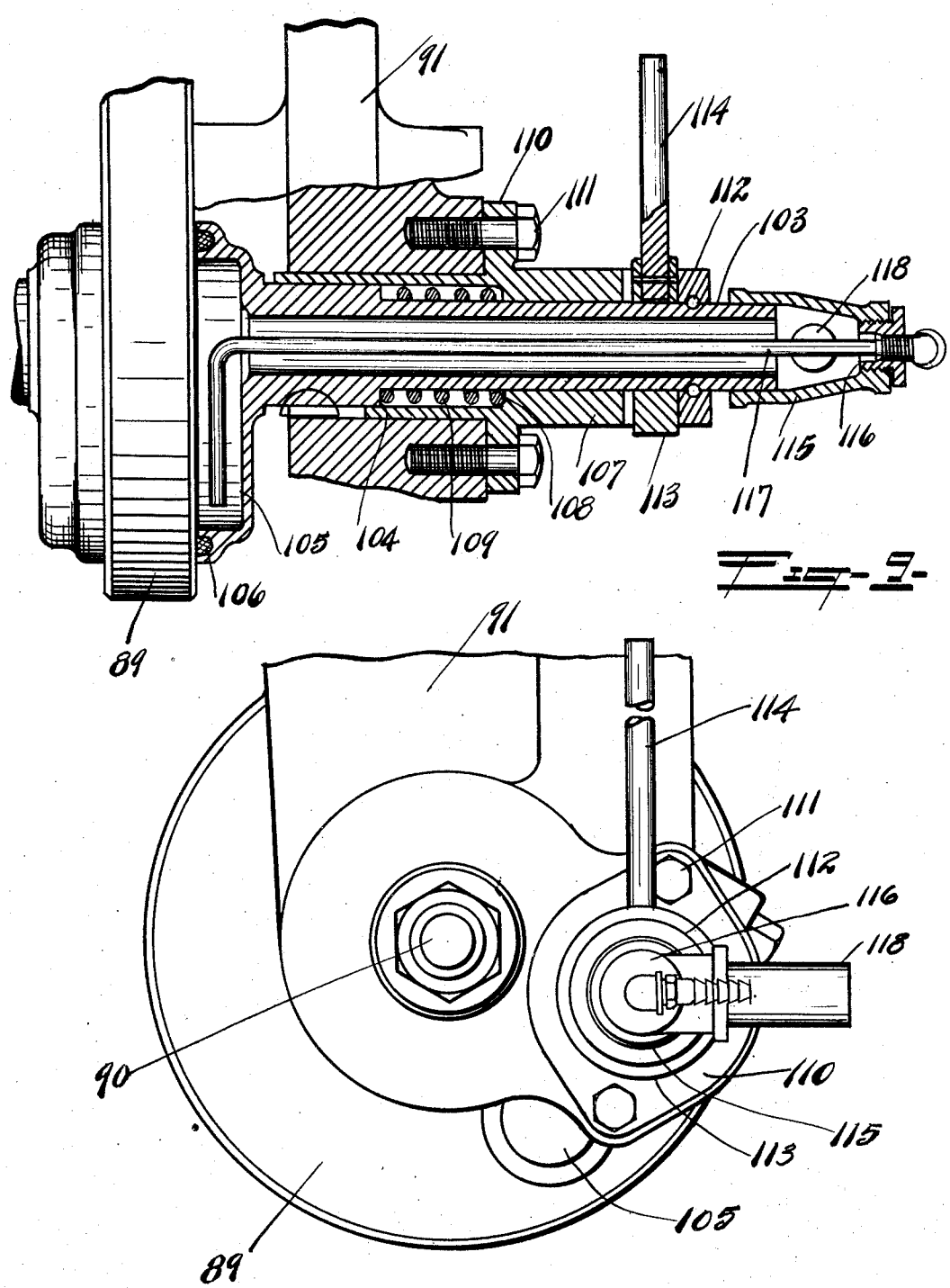

Patented Dec. 30, 1930

1,787,039

UNITED STATES PATENT OFFICE

WILLIAM H. GIBB, OF BAY CITY, MICHIGAN, ASSIGNOR, BY MESNE ASSIGNMENTS, TO THOMSON-GIBB ELECTRIC WELDING COMPANY, A CORPORATION OF MASSACHUSETTS

SEAM-WELDING MACHINE

Application filed June 28, 1928. Serial No. 288,863.

This invention relates to welding machines, and particularly to a seam welding machine for welding the seams of barrel shells, sheet metal cans, and objects of similar classification.

One object of the invention is to provide an automatic traveling carriage having means for clamping the overlapping edges of the sheet to be welded in proper position, and which is then fed between a pair of electrically energized idler welding rolls.

Another object of the invention is to provide mechanical clamps for holding the sheet in set position.

A further object is to provide a traveling reciprocating carriage on which the work is mounted, and which is not a current carrying member, and which automatically feeds the work between the welding rolls to form a continuous welded joint.

A still further object is to provide means for adjusting the carriage, means for regulating the pressure of the rolls on the work, as well as means to compensate for wear of the welding rolls.

A further object still is to provide means for cooling the welding rolls, and means for forming tight, leak proof connections associated with said cooling means.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a side view of my improved seam welding machine, the carriage being shown at the extreme end of its outward stroke.

Fig. 2 is an enlarged side view of the traveling carriage.

Fig. 3 is a top plan view thereof.

Fig. 4 is a transverse sectional view of the carriage taken on the line 4—4 of Fig. 2.

Fig. 5 is a side view of the mechanical clamps.

Fig. 6 is a top plan view thereof.

Fig. 7 is a front view of the clamps, a section of metal being shown clamped in position.

Fig. 8 is an enlarged fragmentary vertical sectional view through the head in which the upper welding roll is mounted.

Fig. 9 is an enlarged fragmentary part sectional edge view of the upper welding roll.

Fig. 10 is a side view of the mechanism shown in Fig. 9.

Fig. 11 is a fragmentary vertical sectional view taken on the line 11—11 of Fig. 2.

The present invention is directed to head and carriage construction, and means for the adjusting and regulation thereof, and while in the present instance I have shown hydraulic means (such as an oil pump), for actuating the carriage and head, it will be clearly obvious that any other actuating means may be used, as this specific actuating mechanism forms no part of the present invention.

Referring now particularly to the drawings in which I have shown the preferred embodiment of my invention, the machine as shown is essentially a single phase transformer and a hydraulic driven machine, the numeral 4 indicating the frame, which can be of any preferred design, having a transformer 5, and a motor 6 mounted on the frame for actuating the hydraulic means.

An arm 7 projects laterally from the frame and is secured thereto and insulated therefrom in any approved manner, this arm being a current carrying member, copper laminations 8 being secured thereto as shown. The outer end of the arm is recessed as shown at 9, and a lower welding wheel 10 is journaled therein, and is cooled by means of circulating water or other fluid carried by the intake and outlet pipes 11 and 12 respectively, which are mounted in the arm and connect to any suitable source of supply. Spaced apart ways 13 are bolted to the bottom of the arm, and are provided with inwardly projecting legs 14 in which a traveling carriage 15 is slidably mounted, said carriage being insulated from the work holder by means of insulation 16.

The carriage comprises a lower supporting member 17, having a pair of side frame members 17ᵃ and 17ᵇ mounted thereon, and held in position by means of bolts 18, the section 17ᵃ and 17ᵇ being vertically adjustable on the support 17, so that these sides may be adjusted to conform to the curvature of the shell being welded, and to keep the work always in line of the lower welding wheel as that member wears.

Bearings 19, 20 and 21 respectively, are cast integral with the support 17, and a longitudinally disposed shaft 22 is journaled therein, gears 23 and 24 being mounted on said shaft, meshing with and driving similar gears 25, which are mounted on the lower end of a pair of vertically disposed shafts 26, the upper ends of said shafts being threaded, and are further shouldered intermediate their length as shown at 27, said shouldered portion together with the collar 28 being grooved and serving as a raceway for anti-friction balls 29, the collar 28 being mounted on a boss 30 which is cast integral with the lower section.

A dowel member 31 is positioned directly adjacent the threaded shaft 26 to prevent binding during the adjustment and bearings 32 are provided on the side frame members as shown, and are insulated from said side frames by means of suitable insulation, (not shown) so that the current will not travel across to the side frame, bolts 33 holding the bearings in proper position on the side frame members.

The end of one of the shafts 22 projects beyond the end of the frame, and is squared as shown at 34 to receive a socket wrench. It is of course understood that there is a shaft 22 on each side of the arm, these shafts being connected by means of a transversely disposed shaft 35 journaled in suitable bearings, (not shown), gears 36 and 37 being mounted on the ends of said shaft, meshing with and being driven by means of similar gears 38 and 39 mounted on the shafts 22, so that both sides of the frame or carriage will be simultaneously adjusted.

Rounded tubular sections 40 are provided on the upper frame section, and serve to support the work as it is placed on the machine, said sections being held in position by means of studs 41 which extend through the bosses on the ends of the side frame members.

A downwardly projecting flange 42 is cast integral with and at the front end of lower supporting member 15, and is suitably drilled to receive the end of the ram 43, said end being threaded as shown, and nuts 44 hold it securely in position, a stop 45 being provided directly adjacent thereto, the shank of the stop being threaded to permit adjustment, the opposite end engaging and actuating the trip 46 which is pivotally connected to the main frame, and which cuts off and reverses the oil flow in any approved manner.

A mechanical clamp 47 is provided on the end of the carriage, and is secured thereto by means of bolts 48, this clamp comprising jaw members 49 and 50 respectively, pivotally secured together by means of bolts 51, the upper jaws 50 are cast integral, the rear end converging and terminating in a leg 52, the end of which is reduced and curved as shown at 53. The lower jaws 49 are separate, the rear ends being connected by means of a shaft 54 on which the cam frame 55 is mounted, a cam roller 56 being mounted in said frame, and is adapted to engage with and actuate the upper jaws 50 when the shaft 54 is rotated, a handle 57 being provided on the end of said shaft to facilitate the manipulation thereof. In Figs. 5 and 6 of the drawings the full lines show the clamp in closed position, the cam roller being in raised position, and when the handle 57 is rotated, the cam frame and roller swing downwardly, permitting the jaw to rise as shown by the dotted lines in Fig. 5.

A block 58 is secured between the rear ends of the lower jaws as shown, being held in position by means of bolts or pins 59, said block being bored or cored as shown at 60 to receive a spring 61, said spring seating against the underside of the head of the bolt 62, which has threaded engagement with the end of the upper jaws 50 to provide a tension thereon, so that as the cam is rotated the spring will automatically force the jaws apart and release the work A.

A cylinder 63 is located on the overhanging arm 64 of the main frame, and a piston (not shown) is reciprocatingly mounted therein, said piston being driven and controlled by hydraulic means, in any approved manner. A threaded rod 65 is connected to said piston, the lower end being threaded and engages a trip 66, the lower end of said trip being shouldered and is mounted in a piston 67 which is reciprocatingly mounted in a tubular opening 68 provided at the end of the overhanging arm, a key 69 preventing rotation thereof.

An offset leg 70 is formed integral with the member 66 and is adapted to engage and actuate a remote control limit switch 71 which can be of any approved construction, said switch being mounted in a cap 72 fitted to the end of the overhanging arm, and is formed with a vertically disposed opening 73 through which the lug 74 projects, an adjusting screw 75 being mounted in said cap and having a hand wheel 76 on the lower end thereof, the upper end having threaded engagement with an opening 77 provided in the lug 74, so that manipulation of the adjusting screw will vertically adjust the switch with relation to the trip leg 70.

The piston 67 is internally bored as shown, and a gland 78 forms a closure for the top thereof, and can be secured in place in any desired manner, a resilient collar 79 being interposed between the gland and the shouldered end of the trip to absorb shocks of any nature.

For securing the proper pressure on the work I provide a spring seat 80 having a centrally disposed threaded opening in which the threaded end of an adjusting shaft 81 is mounted, a coiled spring 82 being interposed between said collar and the shouldered end of the trip. A shoulder 83 is provided on said shaft, and an antifriction bearing 84 is interposed between said shoulder and the bottom of the opening, a bevel gear 85 being secured on the end of the shaft 81 meshing with and being driven by a similar gear 86 mounted on a shaft 87 which is journaled in the housing 88, the end "B" of said shaft being squared to accommodate a socket wrench or the like.

The upper welding roll 89 is mounted on a shaft 90 which is journaled in an upper arm bracket 91, said bracket being adjustably connected to a member 92 which is secured to the lower end of the piston 67, said member being internally threaded to receive the threaded end 93 of the shaft 94, and which is journaled in the bracket 91, a gear 95 being mounted on the end of the shaft, and an antifriction bearing 96 being provided as shown, a similar gear 97 meshing with the gear 95, and is mounted on a shaft 99 which is journaled in the bracket, the end having a squared head "C" to facilitate attachment of a tool when adjusting.

Current is supplied to the welding roll by means of copper laminations 100 which lead from the transformer to the bracket, and clamps 101 secure said laminations tightly in position, an insulated resilient support 102 being connected to the overhanging arm and supporting said laminations.

Means for cooling the upper welding roll is shown in Figs. 9 and 10 of the drawings, and comprises a hollow-spindle 103 shouldered intermediate its length as shown at 104, the inner end 105 being flared as shown, the edge being grooved to receive a packing 106 which engages the side of the welding roll, forming a leakproof water chamber thereat.

A sleeve 107 is fitted over said spindle, and is also shouldered at 108, a coiled spring 109 being interposed between said shoulders as shown, and a flange 110 is cast integral with the sleeve, studs 111 securing said sleeve rigidly to the upper arm bracket. A collar 112 is mounted on the outer end of the spindle, and a shifter wedge 113 is interposed between the end of the sleeve and the collar, and is provided with a handle 114 for manipulation thereof, so that as the handle is actuated, the angled side of the shifter will retract or force the flared end of the spindle tightly against the welding roll, the spring 109 exerting a continuous pressure to hold the flared end of the spindle against the wheel at all times.

A fitting 115 is threaded on the end of the spindle and a threaded gland 116 forms a closure for the end thereof, an intake pipe 117 leading therethrough, the inner end being bent downwardly and into the chamber. An outlet pipe 118 is connected to the side of the fitting 115 leading and connecting to a return pipe 119, the pipe 117 being connected to a supply pipe in the usual manner, the opposite side of the wheel having a similar arrangement.

In operation the large motor 6 actuates the hydraulic means which reciprocates the piston rod 65, a small motor, (not shown), controlling the automatic operation, and as the pressure of the upper welding wheel on the work increases, the spring 82 compresses and the leg 70 of the trip actuates the automatic remote control switch, which in turn operates the switch to complete the welding circuit. The carriage now begins the welding stroke, (actuated by the hydraulic means), and travels the length of the shell to be welded, at the end of the welding stroke, the trip 46 reverses a valve in the hydraulic actuating means, and the pressure of the upper welding wheel is released from the work, the piston rod 65 moving upwardly, and the carriage travels back to original starting position, remaining stationary for an interval of time necessary to permit the unloading of the welded shell, and the reloading of the next shell to be welded, when the cycle is again repeated.

In general practice the shell or container to be welded is spot welded to hold the edges in proper position, the shell is then placed over the end of the carriage the operator next actuates the handle 57 of the mechanical clamp to open the jaws, the end of the shell is placed therein, and the handle is swung down to clamp it tightly in position, then either by stepping on the foot treadle 121 or by the automatic means before mentioned, the cycle of operation is begun.

It will therefore be obvious that the control switch works automatically, and that welding wheel wear can be easily compensated for by manipulation of the adjusting member "C," while the pressure is adjusted by manipulation of the member "B," and alining of work to wheels by adjusting member 22.

From the foregoing description it will be obvious that I have perfected a very simple, substantial, and effective automatic seam welder.

What I claim is:—

1. In an electric seam welding machine comprising a frame, a mandrel secured thereto, a traveling carriage mounted thereon and insulated from said mandrel, a welding wheel journaled on said mandrel, an arm on the frame, a reciprocating head mounted thereon, an upper welding wheel mounted on the head directly above the first mentioned wheel, and means for feeding current to said welding wheels.

2. In an electric seam welding machine comprising a frame, a mandrel, a traveling carriage reciprocatingly mounted thereon and insulated therefrom, a welding wheel journaled in said mandrel, an arm on the frame, a reciprocating head mounted thereon above the mandrel, an upper welding wheel carried thereby, means for feeding current thereto, and means for cooling said welding wheels.

3. In an electric seam welding machine comprising a frame, a mandrel secured thereto, a traveling carriage mounted thereon and insulated therefrom, a clamp mounted on the end of said carriage, means for vertically adjusting said carriage, a welding wheel journaled on the mandrel, an arm on the frame, a reciprocating head mounted on the arm above the mandrel, an upper welding wheel carried thereby, means for feeding current to said wheel, and means for cooling said welding wheels.

4. In an electric seam welding machine comprising a frame, a current carrying mandrel secured thereto, a traveling carriage mounted thereon and having upper sections adjustably connected thereto, means for vertically adjusting said sections, a work clamp mounted on the carriage and adapted to clamp the material to be welded, a welding wheel journaled on said mandrel, an arm on the frame, a reciprocating head mounted thereon above the mandrel, an upper welding wheel mounted on the head, means for cooling said wheels, and means for adjusting said upper wheel.

5. In an electric seam welding apparatus comprising a frame, the combination of an energized mandrel, of a traveling carriage mounted thereon and insulated therefrom, means for adjusting said carriage, a clamp mounted on said carriage, a welding wheel journaled in the mandrel, and means for conducting a cooling agent thereto, an arm on the frame, a reciprocating head mounted thereon, a welding wheel journaled on the head, means for adjusting said wheel, and means for feeding an electric current thereto.

6. In an electric seam welding apparatus, the combination with a frame, of a mandrel having a welding wheel mounted thereon, a traveling carriage, an arm on the frame, a reciprocating head secured thereto, a welding wheel carried thereby, a remote control switch associated with said head, and a trip adapted to actuate said switch at a predetermined point in the travel of said head.

7. In an electric seam welding apparatus, the combination with a frame, of an energized mandrel having a welding wheel mounted thereon, a traveling carriage, an overhung arm on the frame, a reciprocating head mounted thereon, an upper welding wheel journaled on the head, means for feeding electric current thereto, a switch adjacent said head, and a trip for actuating said switch at a predetermined point in the downward travel of said head.

8. In an electric seam welding machine, a frame, a mandrel secured thereto, a welding wheel journaled in the mandrel, a traveling carriage mounted thereon and adapted to support the material to be welded, an arm on the frame, a reciprocating head mounted on said arm, an upper welding wheel carried thereby, means for feeding an electric current thereto, means for adjusting said head, and means for adjusting the pressure of the upper welding wheel on the work.

9. In an electric seam welding machine, a frame, a current carrying mandrel secured thereto, a welding wheel, a traveling carriage mounted on the mandrel, means for conducting a cooling agent to said welding wheel, an arm on the frame, a head mounted on the arm and including a piston, a welding wheel carried thereby, means for adjusting said welding wheel, and means frictionally engaging the sides of the wheel to form a water tight chamber therewith.

10. In an electric seam welding machine, the combination with a frame having a mandrel secured thereto, a welding wheel journaled thereon, of a carriage mounted on said mandrel, a clamp mounted on the carriage and in which the work is clamped, an overhung arm on the frame, a reciprocating head mounted thereon and including a piston, a welding wheel carried on the lower end thereof, a trip associated therewith, a remote control switch adjacent the piston and adapted to be actuated by said trip, means for adjusting said switch with relation to the trip, and means for feeding electric current to said welding wheel.

11. In an electric seam welding machine, the combination with a frame having a mandrel secured thereto, a welding wheel journaled on the mandrel, a traveling carriage, an arm on the frame, a reciprocating head mounted thereon and having a welding wheel journaled on said head and including a bored piston, a trip mounted in said piston, a switch adjacent thereto, and an offset leg on the trip adapted to engage and actuate said switch at a predetermined point in the downward travel of the piston.

12. In an electric welding machine, the combination with a frame, of a current carrying mandrel secured thereto and provided with a recess intermediate its length, a welding wheel mounted therein, a traveling carriage mounted on said mandrel and adapted to support the material to be welded, an overhung arm, a vertically reciprocating head mounted thereon and including a bored piston, a trip mounted in said piston, a collar, a spring interposed between the trip and collar, means for adjusting said collar, a welding wheel mounted on the lower end of the piston, means for conducting an electric current thereto, and means frictionally engaging the sides of said wheel to form water tight chamber therewith.

13. In a seam welding machine, the combination with a mandrel having a welding wheel mounted thereon, a traveling carriage mounted thereon and adapted to support the material to be welded, a vertically reciprocating head having a welding wheel mounted thereon and adapted to engage the material, and means for completing an electric welding circuit at a predetermined point in the downward travel of said head.

14. In a seam welding machine, the combination with a mandrel having a welding wheel mounted thereon, a vertically adjustable traveling carriage mounted thereon and adapted to support a material to be welded, a vertically reciprocating head above the mandrel, an upper welding wheel carried thereby, means for conducting an electric current to said wheel, and means for automatically completing the welding circuit at a predetermined point in the downward travel of said head.

15. In a seam welding machine, the combination with an energized mandrel, a welding wheel journaled thereon, a carriage mounted on said arm and adapted to support a material to be welded, a vertically reciprocating head, an upper welding wheel adjustably mounted thereon and adapted to engage the material, means for conducting electric current to said wheel, automatic means for completing the welding circuit at a predetermined point in the downward movement of said head, and means for cooling said welding wheels.

In testimony whereof I hereunto affix my signature.

WILLIAM H. GIBB.